United States Patent
Won et al.

(10) Patent No.: US 11,188,532 B2
(45) Date of Patent: Nov. 30, 2021

(54) SUCCESSIVE DATABASE RECORD FILTERING ON DISPARATE DATABASE TYPES

(71) Applicant: VMware, Inc., Palo Alto, CA (US)

(72) Inventors: Jong Ho Won, Palo Alto, CA (US); Karen Brems, Redwood City, CA (US); Jiajie Liang, Palo Alto, CA (US); Gregory Bollella, Palo Alto, CA (US); Hui Xu, Palo Alto, CA (US); Arushi Gangrade, Palo Alto, CA (US)

(73) Assignee: VMWARE, INC., Palo Alto, CA (US)

( * ) Notice: Subject to any disclaimer, the term of this patent is extended or adjusted under 35 U.S.C. 154(b) by 78 days.

(21) Appl. No.: 16/687,785

(22) Filed: Nov. 19, 2019

(65) Prior Publication Data

US 2021/0149903 A1  May 20, 2021

(51) Int. Cl.
*G06F 16/24* (2019.01)
*G06F 16/2453* (2019.01)
*G06F 16/2458* (2019.01)

(52) U.S. Cl.
CPC .... *G06F 16/24535* (2019.01); *G06F 16/2471* (2019.01)

(58) Field of Classification Search
None
See application file for complete search history.

(56) References Cited

U.S. PATENT DOCUMENTS

| | | | | |
|---|---|---|---|---|
| 5,859,972 | A * | 1/1999 | Subramaniam | G06F 16/258 709/203 |
| 8,812,490 | B1 * | 8/2014 | Cappiello | G06F 16/24549 707/719 |
| 9,348,880 | B1 * | 5/2016 | Kramer | G06F 16/9535 |
| 2009/0234799 | A1 * | 9/2009 | Betawadkar-Norwood | G06F 16/2471 |
| 2015/0193541 | A1 * | 7/2015 | Nguyen | G06F 16/2471 707/727 |
| 2019/0258636 | A1 * | 8/2019 | Bhattacharjee | G06F 16/2228 |
| 2020/0250197 | A1 * | 8/2020 | Yang | G06F 16/2468 |

* cited by examiner

*Primary Examiner* — Son T Hoang
(74) *Attorney, Agent, or Firm* — Thomas | Horstemeyer, LLP

(57) ABSTRACT

A computing environment is configured to divide a search query into at least a first sub-query and a second sub-query. A first service and a second service are created to execute the first sub-query and the second sub-query and identify search results from a first one and a second one of the databases, respectively, in parallel. For instance, in response to the first set of search results being placed in the first queue, the second one of the services can execute the second subquery on a second database while the first service performs subsequent queries. A final result of the search query can be generated based at least in part on the second set of search results in the second queue.

19 Claims, 7 Drawing Sheets

SUCCESSIVE DATABASE RECORD FILTERING ON DISPARATE DATABASE TYPES

BACKGROUND

The internet-of-things (IoT) refers to interrelated computing devices, sensors, and objects that are network-enabled such that they are periodically able to transfer data over a network. In a management and monitoring system, a number of IoT devices can far exceed a number of managed objects in traditional systems. For instance, a management and monitoring system can interact with hundreds-of-thousands to millions of internet-of-things devices to collect data from each internet-of-things device, thereby producing an extensive amount of data.

For instance, assume that a management and monitoring system oversees internet-of-things devices in various vehicles offered by a vehicle manufacturer. The number of vehicles produced by the manufacturer can be more than ten million per year, and a single vehicle can include tens or hundreds of internet-of-things-enabled sensors. It can be anticipated that the number of internet-of-things devices managed by one organization can be ten million or more. Each internet-of-things device periodically reports metric values for the vehicle, such as temperature, central processing unit utilization, memory usage, etc., along with a respective timestamp reflecting the time at which the metric value was obtained or generated. The number of such metric data points (e.g., timestamp to metric value pairs) stored in one internet-of-things system can easily exceed one-hundred billion or more at a given time.

As such, in internet-of-things systems that oversee an extensive amount of data, the data is often scattered and stored in physically and logically different locations according to various data characteristics. For example, device metadata, such as a device identifier, device name, year of manufacture, software version, hardware information, etc. are usually stored in document databases or relational databases, while time-series metric data generated by internet-of-things devices are stored in time-series databases which are optimized for read-write operations. As the vast amount of data is scattered among different databases, it is challenging to efficiently provide search functionality for users in a computationally efficient manner.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Figure 1:
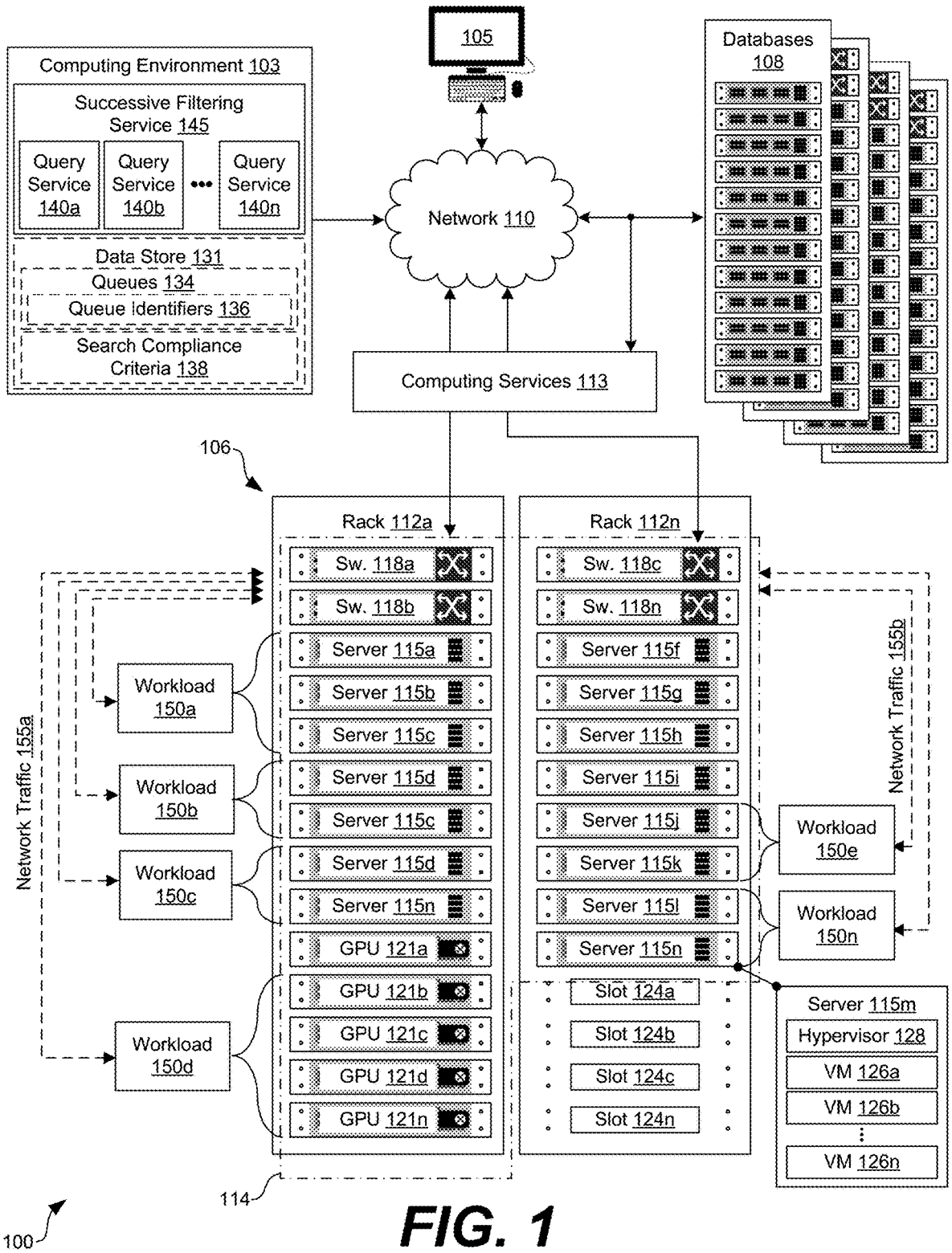
FIG. 1 is a drawing of an example of a networked computing environment for successive database record filtering on disparate database types in the networked computing environment.

The present disclosure relates to successive database record filtering on disparate database types. In internet-of-things systems that store and access extensive amounts of data, sometimes millions to billions of database records, the data is often scattered and stored in physically and logically different locations according to various data characteristics. For example, device metadata, such as device identifiers, device names, years of manufacture, software versions, hardware information, etc. are usually stored in traditional relational databases, while time-series metric data generated by internet-of-things devices are stored in time-series databases. As the vast amount of data is scattered among different databases, it is challenging to efficiently provide search functionality for users in a computationally efficient manner.

For instance, assume a user, such as an information technology (IT) administrator, performs a search query to identify employee devices that are using a particular version of an operating system having a security vulnerability. The user may access an administrator console to provide criteria of the search, which is traditionally converted to a search query, such as a structured query language (SQL) query to be executed on a database.

However, some of the data requested by the user may be stored in separate databases that are logically and/or physically separate from one another. For instance, an employee database may be separate than an employee device database, which are both different than a database that stores information pertaining to versions of operating systems executing on employee devices. Assuming the search query requires data from multiple databases, traditionally, a scan-all-and-join operation is performed. More specifically, all or a portion of the search query is performed on a first database. Once the results are retrieved, those results are used to query a second database, and so forth, until data is retrieved from all databases. The resulting data is joined and returned to the end user that performed the search query.

There are many limitations of scan-all-and-join search operations. First, these operations are computationally expensive and slow. Notably, data from various queries cannot be aggregated until all queries subject to the search operation have been completed. As such, the end user may have to wait a significant length of time to view search results depending on a number of databases searched and/or a number of database records applicable to the search. Second, the different databases may utilize different query languages. For instance, SQL databases require SQL-compliant search queries, which will not successfully perform a search on a non-SQL database.

Accordingly, various examples are described herein for performing successive filtering which executes searches on logically and/or physically separate databases in parallel. As will become apparent in the examples described herein, the computational resources required to perform the search are significantly reduced and search results are provided faster to a requesting service as compared to the same search query performed using a scan-all-and-join operation.

In some examples, a computing environment receives a search query, for instance, in response to a search being performed by an end user on a client device. From the search query, the computing environment identifies a number of databases required to be searched based on the search query, and divides the search query into sub-queries based on a number of identified databases. For instance, the computing environment can divide the search query into at least a first sub-query to be executed on a first database and a second sub-query to be executed on a second database.

Further, in some examples, the computing environment can create a first service and a second service to execute the first sub-query and the second sub-query, and concurrently identify search results from a first one and a second one of the databases, respectively. For instance, in response to the first set of search results being placed in the first queue, the second one of the services can execute the second sub-query on a second database while the first service performs subsequent queries. A final result of the search query can be generated based at least in part on the second set of search results in the second queue.

Turning now to FIG. 1, an example of a networked environment 100 is shown. The networked environment 100 can include a computing environment 103, client devices 105, various computing systems 106, and databases 108 in communication with one other over a network 110. The network 110 can include, for example, the Internet, intranets, extranets, wide area networks (WANs), local area networks (LANs), wired networks, wireless networks, other suitable networks, or any combination of two or more such networks.

The networks of the networked environment 100 can include satellite networks, cable networks, Ethernet networks, telephony networks, and other types of networks. The computing systems 106 can include devices installed in racks 112a . . . 112n (collectively "racks 112"), which can make up a server bank, aggregate computing system, or a computer bank in a data center or other like facility. In some examples, the computing systems 106 can include high-availability computing systems, which includes a group of computing devices that acts as a single system and provides a continuous uptime. The devices in the computing systems 106 can include any number of physical machines, virtual machines, virtual appliances, and software associated therewith, such as operating systems, drivers, hypervisors, scripts, and applications.

The computing systems 106, and the various hardware and software components contained therein, can include infrastructure of the networked environment 100 that provide one or more computing services 113. Computing services 113 can include virtualization services in some examples. For instance, the computing services 113 can include those that serve up virtual desktops to end users accessed by a client device 105. Thus, the computing environment 103 can also be described as a virtual desktop infrastructure (VDI) environment in some examples.

In other examples, the computing services 113 can include those that provide a public cloud computing environment, a private cloud computing environment, or a hybrid cloud computing environment, which includes a combination of a public and private cloud computing environment. As such, the computing environment 103 can be referred to as a cloud computing environment in some examples.

In further examples, the computing services 113 can provide an applicant programming interface (API) that permits an application or service to store and access data from one or more databases 108. The databases 108 can include memory accessible by one or more of the servers 115. For instance, the databases 108 can include one or more relational databases 108, such as structured query language databases, non-SQL databases, time-series databases, or other relational or non-relational databases.

In some examples, a first portion of the databases 108 are logically distinct from a second portion of the databases 108. In other words, an independent query must be executed on each of first portion and the second portion of the databases 108 to store or access data therefrom. As the databases 108 can include one or more relational, non-relational, or time-series databases, it is understood that each databases 108 can have its own criteria for executing a compliant search query, for instance, based on a type of respective ones of the databases 108. For instance, an SQL-complaint query must be executed on a SQL database to successfully store or retrieve data from the SQL database, whereas a time-series-complaint query must be executed on a time-series database to successfully store or retrieve data from the time-series database. As such, it is understood that a search query compliant for a first type of database 108 may be different than a search query compliance for a second type of database 108.

The computing environment 103 can include an enterprise computing environment that includes hundreds or even thousands of physical machines, virtual machines, and other software implemented in devices stored in racks 112, distributed geographically, and connected to one another through the network 110. As such, the computing environment 103 can be referred to as a distributed computing environment in some examples. It is understood that any virtual machine or virtual appliance is implemented using at least one physical device, such as a server or other computing device.

The devices in the racks 112 can include various physical computing resources 114. The physical computing resources 114 can include, for example, physical computing hardware, such as memory and storage devices, servers 115a . . . 115n, switches 118a . . . 118n, graphics cards having one or more GPUs 121a . . . 121n installed thereon, central processing units (CPUs), power supplies, and similar devices. The devices, such as servers 115 and switches 118, can have dimensions suitable for quick installation in slots 124a . . . 124n on the racks 112.

In various examples, the servers 115 can include requisite physical hardware and software to create and manage virtualization infrastructure, a cloud computing environment, and/or a serverless computing environment. Also, in some examples, the physical computing resources 114 can be used to provide virtual computing resources, such as virtual machines or other software, as a computing service 113.

Each server 115, such as representative server 115m, can act as a host in the networked environment 100, and thereby can include one or more virtual machines 126a . . . 126n (collectively "virtual machines 126"). In some examples, a hypervisor 128 can be installed on a server 115 to support a virtual machine execution space within which one or more virtual machines 126 can be concurrently instantiated and executed. The hypervisor 128 can include the ESX™ hypervisor by VMware®, the ESXi™ hypervisor by VMware®, or similar hypervisor 128 in some examples. It is understood that the computing systems 106 can be scalable, meaning that the computing systems 106 in the networked environment 100 can increase or decrease dynamically to include or remove servers 115, switches 118, GPUs 121, power sources, and other components without downtime or otherwise impairing performance of the computing services 113 offered up by the computing systems 106.

The computing services 113 can be offered through execution of an application or service on one or more of the virtual machines 126. As such, the computing services 113 can include, for example, web services that can be invoked through an application programming interface through submission of requests over the network 110 for particular actions to be performed or for particular data to be returned, for instance, from the databases 108. Additionally, in some examples, the computing services 113 can be implemented in computing containers, where each of the containers can include a self-contained execution environment having its own CPU, memory, block input/output (I/O), and network resources which is isolated from other containers. In some examples, one or more containers can be executed in a virtual machine 126.

Referring now to the computing environment 103, the computing environment 103 can include, for example, a server or any other system providing computing capability. Alternatively, the computing environment 103 can include one or more computing devices that are arranged, for example, in one or more server banks, computer banks, computing clusters, or other arrangements. The computing environment 103 can include a grid computing resource or any other distributed computing arrangement. The computing devices can be located in a single installation or can be distributed among many different geographical locations. The computing environment 103 can include or be operated as one or more virtualized computer instances in some examples. Although shown separately from the computing systems 106, it is understood that in some examples the computing environment 103 can be included as all of or a part of the computing systems 106.

For purposes of convenience, the computing environment 103 is referred to herein in the singular. Even though the computing environment 103 is referred to in the singular, it is understood that a plurality of computing environments 103 can be employed in the various arrangements as described above. As the computing environment 103 communicates with the computing systems 106 and client devices 105 over the network 110, sometimes remotely, the computing environment 103 can be described as a remote computing environment 103 in some examples. Additionally, in various examples, the computing environment 103 can be implemented in servers 115 of a rack 112, and can manage operations of a virtualized or cloud computing environment through interaction with the computing services 113.

The computing environment 103 can include a data store 131, which can include one of the databases 108 in some examples. The data store 131 can include memory of the computing environment 103, mass storage resources of the computing environment 103, or any other storage resources on which data can be stored by the computing environment 103. The data store 131 can include memory of the servers 115 in some examples. Similar to the databases 108, the data store 131 can include one or more relational databases, such as structured query language databases, non-SQL databases, or other relational or non-relational databases. The data stored in the data store 131, for example, can be associated with the operation of the various services or functional entities described below.

The data store 131 can include a database 108 or other memory that includes, for example, queues 134, queue identifiers 136, search compliance criteria 138, as well as other data. The queues 134 can include memory where search results are stored for access by other services. For instance, as various query services 140a . . . 140n (collectively "services 140") can be executed in parallel in accordance with the examples described herein, each query service 140 can store search results for access by a downstream query service 140 in one or more queues 134. It is understood that a data structure comprising the search results can be stored in the queues 134 be a respective one of the query services 140. Each data structure can include a queue identifier 136 that uniquely identifies a search result, or a data structure corresponding thereto, in a queue 134.

Search compliance criteria 138 can include criteria used to generate a compliant search query for particular ones of the database 108. As such, search compliance criteria 138 can include function names, variable names, variable placement, and other information that can be used to programmatically generate a search query to be executed on one of the databases 108. For example, the computing environment 103 can generate an SQL-compliant search query to be executed on an SQL-type of database 108 or, similarly, the computing environment 103 can generate a time-series-compliant search query to be executed on a time-series-type of database 108, and so forth.

The components executed on the computing environment 103 can include, for example, a successive filtering service 145 as well as other applications, services, processes, systems, engines, or functionality not discussed in detail herein. The successive filtering service 145 can perform parallel executions of search queries on different ones of the databases 108 concurrently, thereby speeding up searches and lessening use of computational resources.

In some examples, the successive filtering service 145 analyzes a search query when received from the client device 105 and divides the search query into various sub-queries. For instance, if a search query requires data from three databases 108, the successive filtering service 145 can create three sub-queries, each sub-query being executed on a respective one of the databases 108. Alternatively, if a search query requires data from four databases 108, the successive filtering service 145 can create four sub-queries, and so forth.

Further, the successive filtering service 145 can spawn query services 140 for each database 108 or sub-query. For example, if a search query requires data from four databases 108, the successive filtering service 145 can create four query services 140, each designed to execute a respective sub-query on a corresponding one of the databases 108. In some examples, each of the services 140 includes a process, a thread, a virtual machine, or other virtual service suitable for executing a search query.

Ultimately, the various physical and virtual components of the computing systems 106 can process workloads 150a . . . 150n. Workloads 150 can refer to the amount of processing that a server 115, switch 118, GPU 121, or other physical or virtual component has been instructed to process or route at a given time. The workloads 150 can be associated with virtual machines 126, public cloud services, private cloud services, hybrid cloud services, virtualization services, device management services, containers, or other software executing on the servers 115. For instance, the workloads 150 can include tasks to be processed to provide end users with results of a search query, referred to herein as query results or final results.

Figure 2:
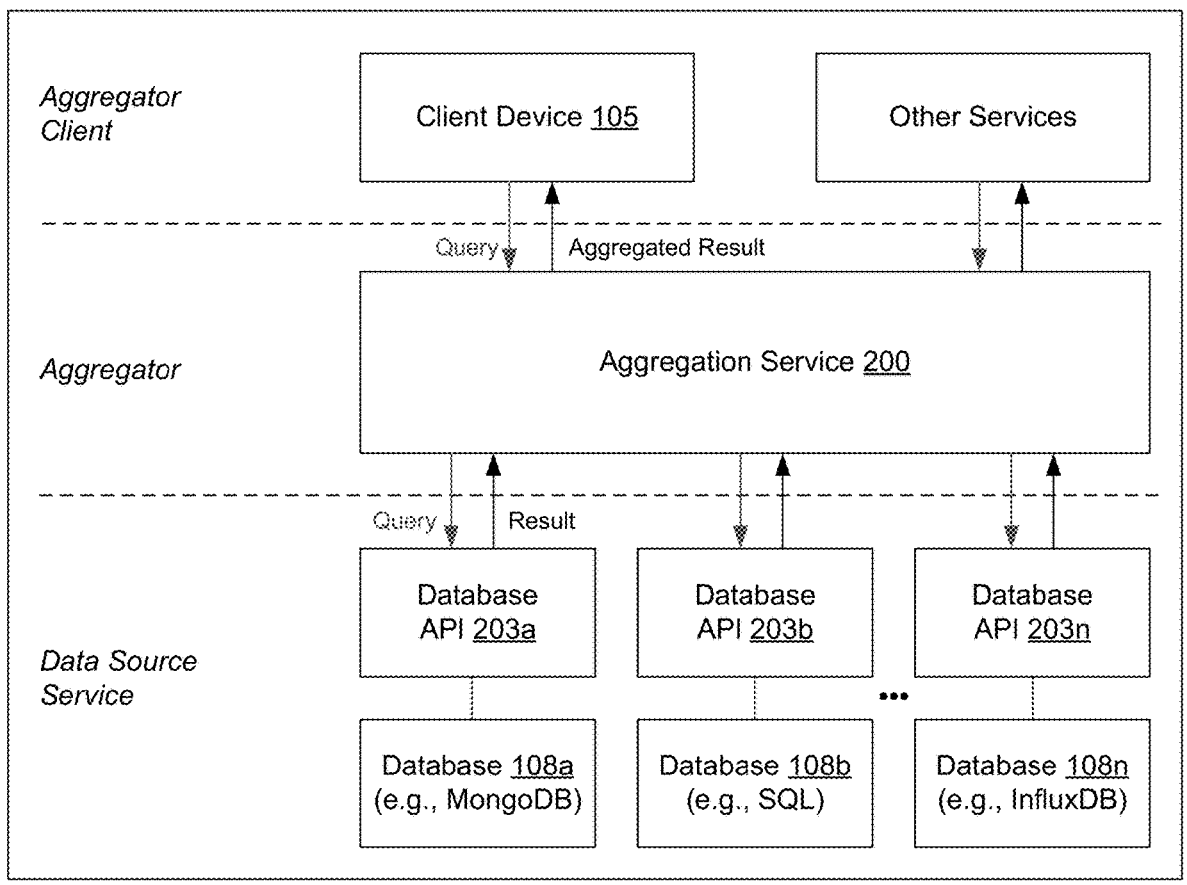
FIGS. 2 and 3 are schematic diagrams illustrating example computer architecture for performing a scan-all-and-join operation.
Figure 3:
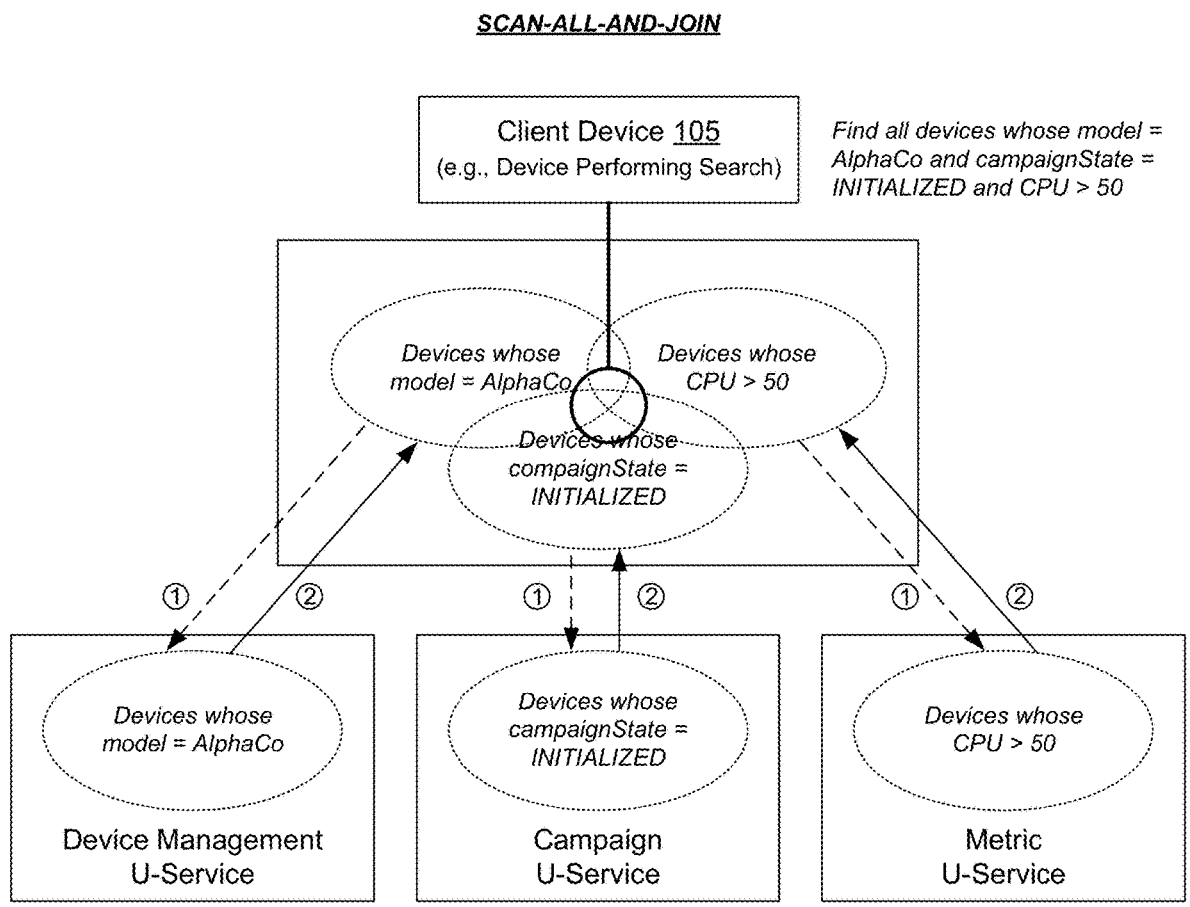

Referring now to FIGS. 2 and 3, schematic diagrams are shown illustrating example computer architecture for performing a scan-all-and-join operation. When a user of a client device 105 perform a search query, the data requested by the user may be stored in separate databases 108 that are logically and/or physically separate from one another, as shown in FIG. 2. For instance, a database 108 storing employee data may be separate than a database 108 storing employee device data, which are both different than a database 108 storing information pertaining to versions of operating systems executing on employee devices.

Assuming the search query requires data from multiple databases, traditionally, a scan-all-and-join operation is performed. More specifically, search queries are performed on the various databases 108; however, the data obtained from the various databases 108 cannot be aggregated and returned to a requesting client device 105 until data is retrieved from all databases 108. The resulting data is joined by an aggregation service 200, and is returned to the client device 105 that initiated the search query or other suitable service.

Notably, the aggregation service 200 can include Apache® Calcite, which is a data management framework that uses scan-all-and-join operations. Unfortunately, the scan-all-and-join operations do not scale in internet-of-things applications considering millions to billions of potential database entries. Given a search query, such as "FIND ALL devices WHOSE model=AlphaCo AND campaign_state IS "initialized" AND cpu IS GREATER THAN 50", Apache® Calcite query divides the query into three separate queries and sends the three queries to corresponding database APIs 203a . . . 203n for the databases 108. After fetching the results into memory, the aggregation service 200 performs a join operation using data from each database 108, and returns a final result. This may be sufficient when the amount of data retrieved is small. However, this can be inefficient when the amount of retrieved data is large and the final result after the joining operation is small. As such, the scan-all-and-join-operation requires a large amount of memory and notable time to determine and return the final result.

Accordingly, there are many limitations of scan-all-and-join search operations, such as the search being computationally expensive and slow. Notably, data from various queries cannot be aggregated until all queries subject to the search operation have been completed. As such, the end user may have to wait a significant length of time to view search results depending on a number of databases 108 searched and/or a number of database records applicable to the search. Further, this operation creates a high overhead on the database 108.

Additionally, the different databases 108 may utilize different query languages. For instance, SQL databases require SQL-compliant search queries, which will not successfully perform a search on a non-SQL database. The scan-all-and-join-operation cannot return a first page of search results to a user interface of the client device 105. Instead, it can only return a final result when data from all of the search operations have been aggregated.

Figure 4:
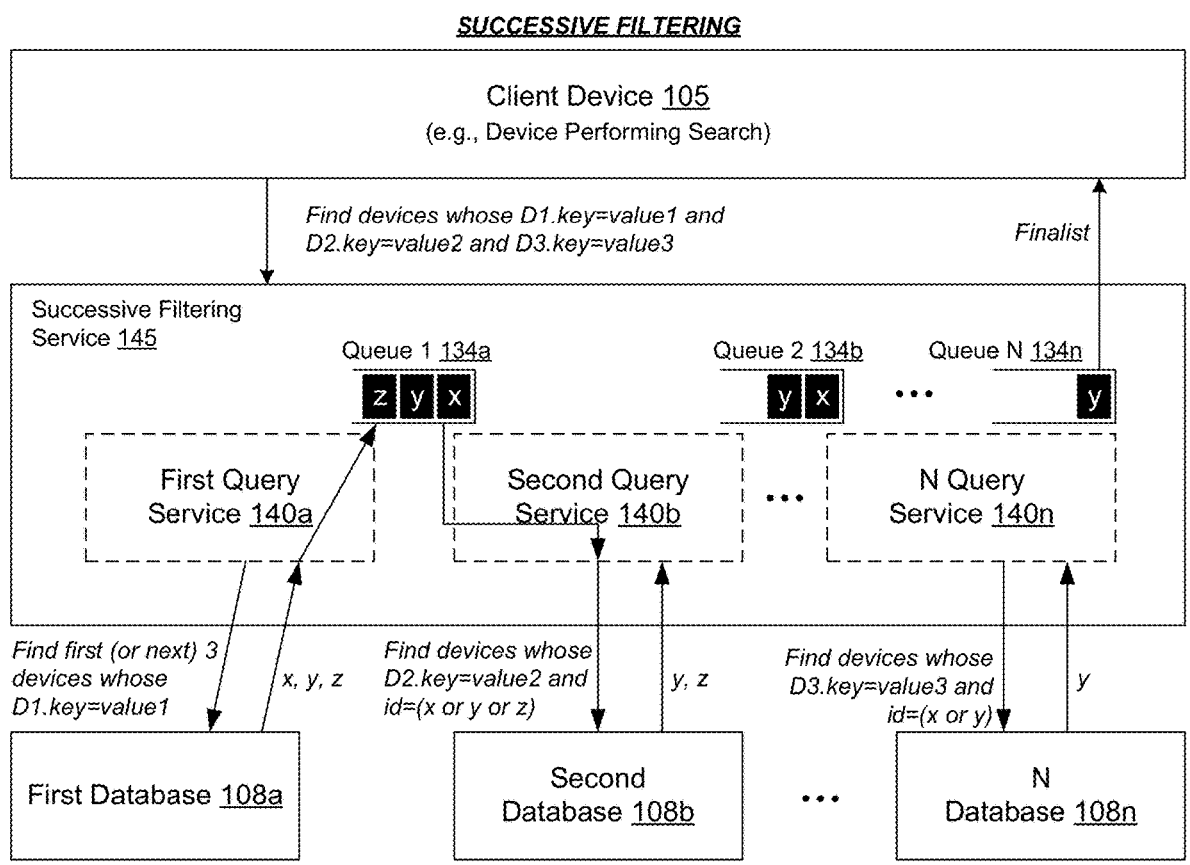
FIGS. 4 and 5 are schematic diagrams illustrating example computer architecture for performing successive filtering on disparate database types.
Figure 5:
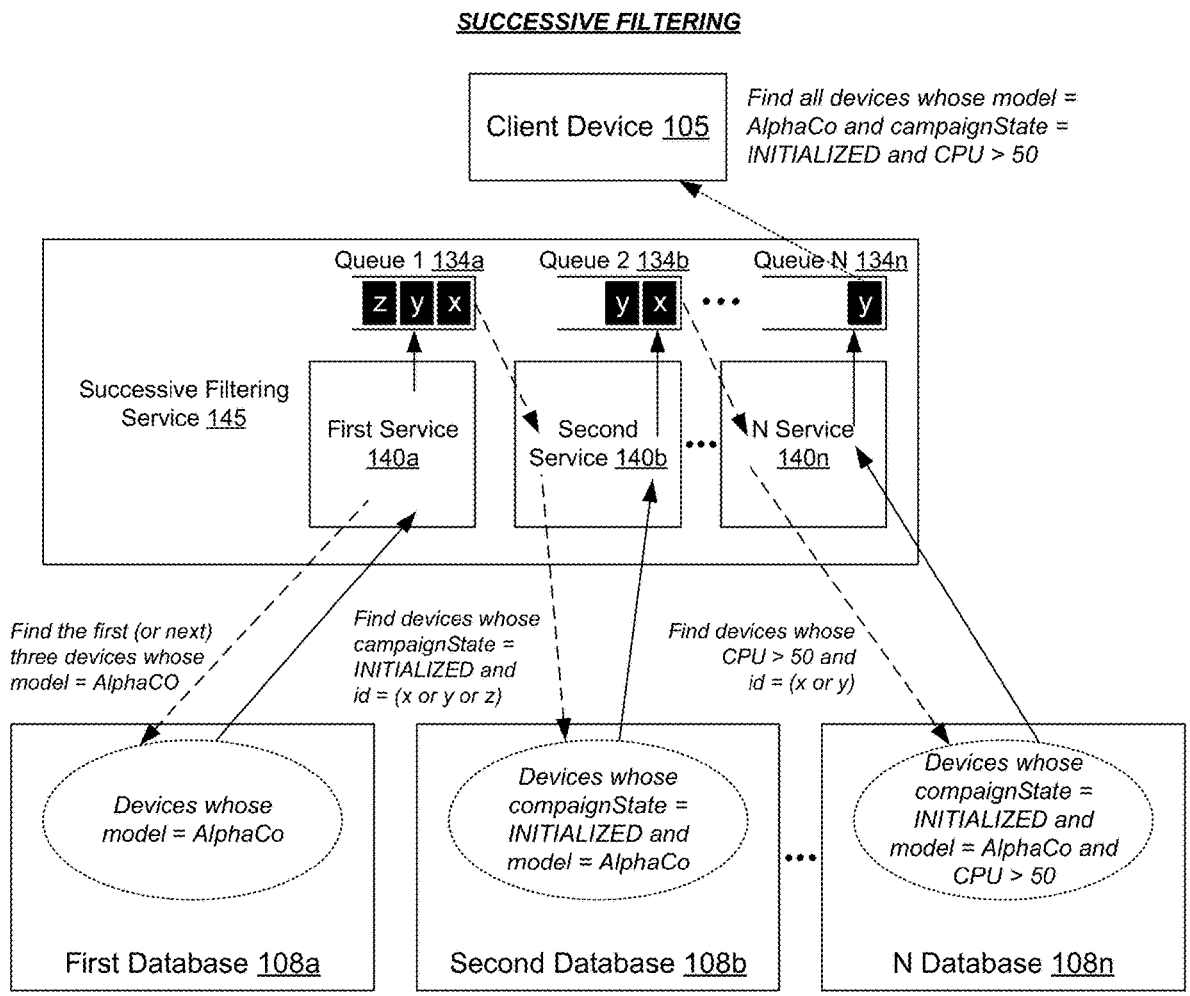

Accordingly, in various examples described herein, the successive filtering service 145 acts as an aggregator to successively filter data from multiple data sources, such as logically distinct databases 108. Referring now to FIGS. 4 and 5, the successive filtering service 145 can create services 140, also referred to as workers, for each of the databases 108 subject to a search. The services 140 can include threads, processes, virtual machines, or other services 140 configured to work concurrently or in parallel, while cooperating using shared memory, such as shared queues 134. In some examples, the services 140 can be executed in a predetermined order, as will be described.

For example, assume that a search query executed on a client device 105 requires data from three databases 108. A first one of the services 140a can obtain a predetermined number of "devices" from the first database 108 and place the search results in the first queue 134a. Thereafter, the second one of the services 140b can obtain identifiers for the devices from the first queue 134a, and execute a query to the second database 108 that filters out the predetermined number of devices based on their identifiers. The second one of the services 140b can place the devices, as filtered by the second database 108b, into the second queue 134b. Similarly, the third one of the services 140n can obtain the identifiers of the devices from the second queue 134n, and generate a query to the third database 108n to filter out the devices. The third one of the services 140n can place the devices, as filtered by the third database 108, into a data structure, referred herein as a final list or a final result, which can store final search results. Finally, the successive filtering service 145 immediately returns the partial list of current devices in in the final list to a requester, such as the client device 105 initializing the search query. As such, an end user of the client device 105 can see a first page of search results, for instance, quickly after conducting the search.

Note that the first one of the services 140a can continue requesting an additional predetermined amount of search results, such as devices, from the first database 108 and continue to place them in the first queue 134a regardless of the status of the second one of the services 140b and regardless of whether the second one of the services 140b consumes or removes search results from the first queue 134a. The second one of the services 140b, as well as any downstream services 140, can continue consuming search results from the first queue 134a, the second queue 134b, and so forth if the queue 134 is not empty. When search results are obtained, the respective one of the services 140 can query a corresponding one of the databases 108 and generate a query that filters results based on the search results obtained from the queue 134. In this way, the services 140 work in parallel until the search is complete and all search results have been returned.

Unlike scan-all-and-join operations, the successive filtering service 145 does not create a long-lived database cursor, which occupies memory in a computing system. For instance, a search query, such as "SELECT * FROM devices WHERE year='2019' ORDER BY id", opens a long-lived database cursor and obtains all results through the cursor. Even though this approach can be fast, it requires the cursor to remain in memory until the cursor identifies all of the results which can be computationally expensive.

According to various examples, the successive filtering service 145 can determine an order of the services 140. For instance, a naïve approach includes services 140 acting as a filter being assigned a higher order of priority to execute a search query, and services 140 dedicated to making projections execute their search queries later. In the event of a tie, a metadata database 108 is searched first and a time-series database 180 is searched later. In other words, a type of the database 108 can be used in determining priority of execution of the service 140. Note that in a SQL statement, such as "SELECT name FROM * WHERE CPU>90", the SELECT clause, e.g., 'name', is the projection and the WHERE clause, i.e., 'CPU>90' is the filter.

Given a query, such as "SELECT name FROM * WHERE cpu>90", according to a naïve approach, the service 140 which obtains records from a time-series database 180 becomes the first one of the services 140 in terms of priority for execution, and the service 140 which obtains records from the metadata database 108 becomes the second service 140. Given a query, such as "SELECT name FROM * WHERE year=2019 AND CPU>90", the service 140 which obtains records from the metadata database 108 becomes the first service 140 due to the tie-breaker rule.

However, this approach can be inefficient if the number of devices filtered by the time-series database is the smallest. For example, assume that there are ten-million devices. Among the devices, the number of devices whose year is 2019 is nine million, the number of devices whose CPU utilization is greater than 90% is one-thousand, and the number of devices whose year is 2019 and CPU utilization is greater than 90% is ten. Given a query, such as "SELECT NAME from * WHERE year=2019 AND CPU>90", the service 140 that queries the metadata database 108 becomes the first service 140 in terms of priority, and the service 140 that queries the time-series database 108 becomes the second service 140. Therefore, the first service 140a must obtain nine million devices from the metadata database 108. The second service 140b must send queries with the identifiers of nine million devices to the time-series database. The second service 140 interacts with the time-series database 108 to filter nine to ten million devices, and the number of the final results is only ten.

Conversely, assume that the first service 140a queries the time-series database 108 and the second service 140b queries the metadata database 108. As a result, the first service 140a only needs to obtain one-thousand devices from the time-series database 108 and the second service 140b only needs to execute queries with identifiers of one-thousand devices to the metadata database 108. Roughly, this order (the first service 140 querying the time-series database 108 executing before the second service querying the metadata database 108) is nine-thousand times faster than the former (the first service 140 querying the metadata database 108 executing before the second service querying the time-series database 108) considering only the number of transmitted devices along with queries.

To optimize the order, in some examples, the successive filtering service 145 can determine the number of devices whose year is 2019, and the number of devices whose CPU utilization is greater than 90%. One example includes sending COUNT queries, first to the metadata database 108 and the time-series database 108, as follows:

SELECT count(*) FROM devices WHERE
    year=2019 (COUNT1)

SELECT count(*) FROM cpu-utilization WHERE
    CPU>90 (COUNT2)

However, count queries are expensive if the number of records is large. Indeed, the response of the second query would be very slow because the query will fetch the records of all the devices, e.g., ten million devices, from a disk first, and then filter out devices whose CPU<=90. Note that metric values are not indexed in many types of database 108.

To optimize the successive filtering service 145, a sampling method can be employed where device identifiers are randomly selected. The device identifiers can include, for instance, a universally unique identifier (UUID) comprising 16 bytes, or other suitable identifier. As such, the exact count of the first query (COUNT1) and the count of the second query (COUNT2) are not needed because ordering optimization is meaningful only when the difference between COUNT1 and COUNT2 is large.

Given a target sampling size, e.g., 4,000, the above count queries can be refined as follows:

SELECT count(*) FROM devices WHERE
    year=2019 AND id=/^4B/QUERY2)

SELECT count(*) FROM cpu-utilization WHERE
    CPU>90 AND id=/^4B/'ID=/^AB/', where the count query is only intended for the devices whose identifier starts with '4B', such as 4B916fd6-a9f6-11e9-a2a3-2a2ae2dbcce4. '4' and 'B' are values that can be randomly selected between 0~9 or between A~F. Specifying the first two characters reduces the device space from one million to 3,906 (=1,000,000/(16*16)). If we want to reduce the target sampling size for speed, e.g., to two-thousand, the queries can be refined as follows:

SELECT count(*) FROM devices WHERE
    year=2019 AND id=/^4B[2-9]/

SELECT count(*) FROM cpu-utilization WHERE
    CPU>90 AND id=/^4B[2-9]/

Then, the device space becomes approximately 1,953 (=1,000,000/(16*16*2)). Notably, a trade-off between query speed and accuracy exists.

Figure 6:
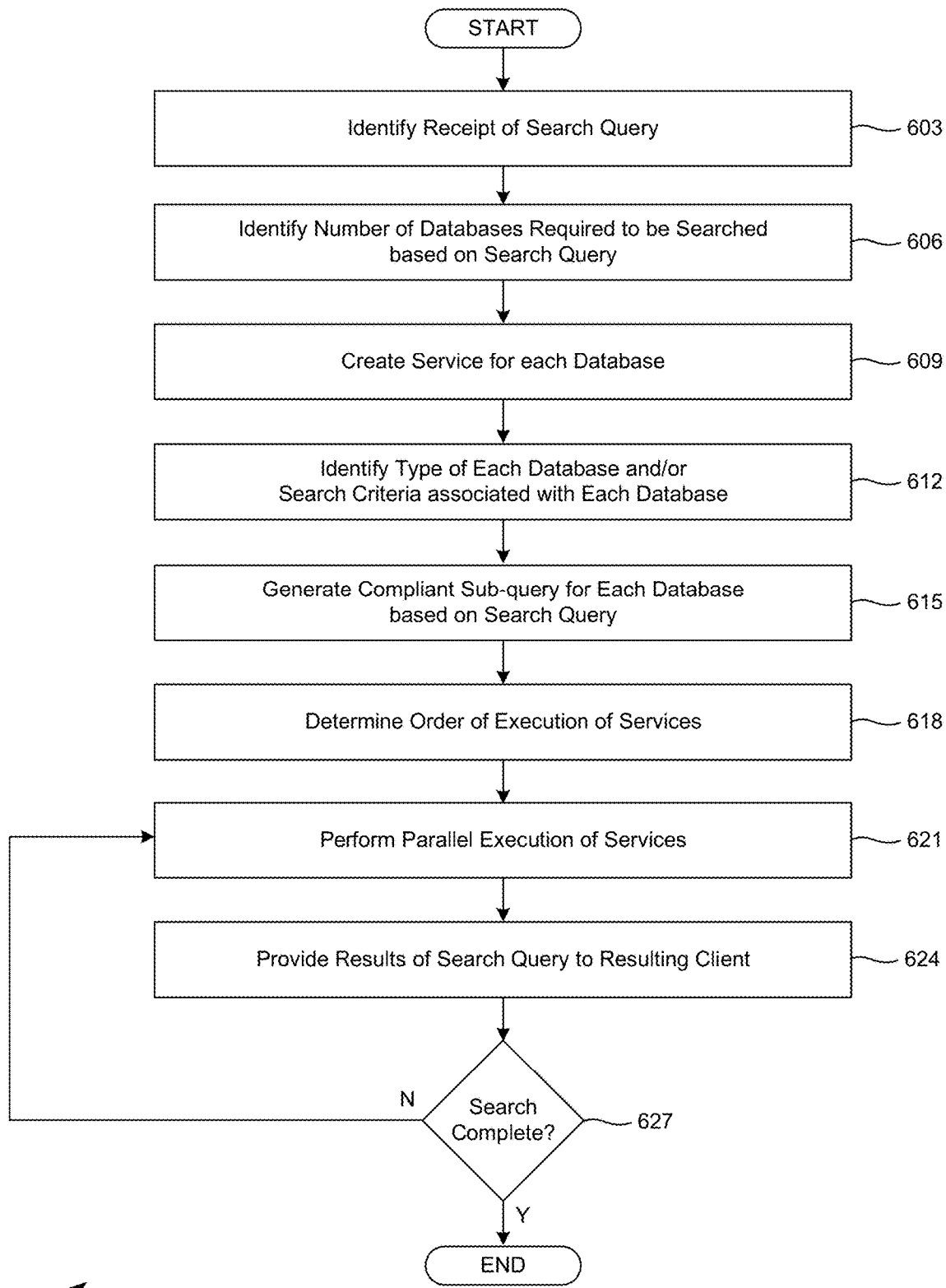
FIGS. 6 and 7 are flowcharts illustrating functionality implemented by components of the networked computing environment of FIG. 1 in performing successive filtering on disparate database types.

Moving on to FIG. 6, a flowchart is shown that provides one example of the operation of a portion of the networked environment 100. The flowchart of FIG. 6 can be viewed as depicting an example of elements of a method implemented by the successive filtering service 145 executing in the computing environment 103 according to one or more examples. The separation or segmentation of functionality as discussed herein is presented for illustrative purposes only.

In step 603, the computing environment 103 can identify receipt of a search query. In some examples, a user of a client device 105, such as an administrator or other individual user, can access a user interface that includes one or more user interface elements for performing a search query, as can be appreciated. For instance, the user can access a search engine to identify internet-of-things devices meeting certain criteria. Based on the information provided in the user interface, a search request is sent from the client device 105 to the computing environment 103. The search request can be received in JSON, XML, or other suitable format in various examples.

In step 606, the computing environment 103 can identify a number of databases 108 required to be searched based on the search query. For instance, if an end user performs a search query to determine a number of devices existing in an internet-of-things environment, a single database 108 can be consulted, such as one having unique identifiers for each of the devices. Alternatively, if the search query is performed to identify more information, such as CPU measurements of individual ones of the internet-of-things devices, queries to multiple databases 108 can be required. The number of databases 108 can be identified based on usage of variable names in some examples, or by consulting with a database index.

In step 609, the computing environment 103 can create one or more services 140 for querying the databases 108 identified in step 606. In various examples, a service 140 is created for each of the databases 108. For instance, if eight databases 108 are identified in step 606, in step 608, the computing environment 103 can spawn eight services 140 to perform queries on each of the databases 108. In other words, there can be a one-to-one correspondence between a service 140 and a database 108 in some examples. In some examples, each of the query services 140 created in step 609 can include a process, a thread, a virtual machine, or other virtual service suitable for executing a search query. In some examples, the computing environment 103 can initialize one or more queues 134 to be shared among the services 140, such as a global queue or shared memory space.

In step 612, the computing environment 103 can identify a type of each database 108 and/or search criteria associated with each database 108. The type of each database 108 can include, for instance, relational, non-relational, time-series, metadata, or other known type of database. In further examples, the type of database 108 can include a proprietary type of database 108, such as MongoDB, SQL, or other database.

In step 615, the computing environment 103 can generate a compliant sub-query for each of the databases 108 based on the search query. The sub-query can include a portion of the query specific to a particular one of the databases 108 identified in step 606. For instance, assuming a search query retrieves data from four databases, the computing environment 103 can generate four sub-queries to assign to each of the four services 140. Understandably, an SQL-complaint query must be executed on a SQL database to successfully store or retrieve data from the SQL database, whereas a time-series-complaint query must be executed on a time-series database to successfully store or retrieve data from the time-series database. As such, it is understood that a search query compliant for a first type of database 108 may be different than a search query compliance for a second type of database 108. The computing environment 103 can generate the sub-queries such that the sub-queries are complaint on the respective types of databases 108 identified in step 612. For instance, a first sub-query can include a SQL query to be executed on an SQL-type database 108, a second sub-query can include a MongoDB query to be executed on a MongoDB-type database 108, and so forth.

In various examples, the sub-queries are generated based on search compliance criteria 138, where search compliance criteria 138 can include criteria used to generate a compliant search query for particular ones of the database 108. As such, search compliance criteria 138 can include function names, variable names, variable placement, query order, and other information that can be used to programmatically generate a search query to be executed on one of the databases 108. For example, the computing environment 103 can generate an SQL-compliant search query to be executed on an SQL-type of database 108 or, similarly, the computing environment 103 can generate a time-series-compliant search query to be executed on a time-series-type of database 108, and so forth In step 618, the computing environment 103 can determine an order of execution for individual ones of the services 140. For instance, the computing environment 103 can determine an order to optimize the search, reducing the time needed to perform the search and the amount of computing resources required in conducting the search. In some examples, the computing environment 103 determine an order of execution of the services 140 based on a type of the database and/or a number of search results for each of the sub-queries. As the COUNT database operation can be computationally expensive, especially in internet-of-things applications where millions to billions of records are stored, in some examples, the computing environment 103 can estimate the number of search results for each sub-query.

To this end, the computing environment 103 can randomly select at least a portion of an identifier uniquely identifying one of the search results. In but one example, the identifier can include a universally unique identifier comprising, for instance, 16 bytes. For instance, where the count query is only intended for the devices whose identifier starts with '4B', such as 4B916fd6-a9f6-11e9-a2a3-2a2ae2dbcce4. '4' and 'B' are values that are randomly selected between 0~9 or between A~F. Further, the computing environment 103 can perform a count search query using the portion of the identifier randomly selected and estimate a number of search results to be obtained by the services 140 based at least in part on a result of the count search query. Further, in some examples, the order of execution of services 140 can be in increasing order based on the number of search results. For instance, a first query having a first amount of search results is executed before a second query that generates a second amount of search results greater than the first amount.

In step 621, the computing environment 103 can perform parallel execution of the services 140. For instance, the computing environment 103 can direct the first one of the services 140*a* perform a first sub-query to retrieve a predetermined threshold of search results, referred to as a batch size, such as thirty search results. The first one of the services 140*a* will store these thirty search results in the first queue 134*a*, as shown in FIGS. 4 and 5. Thereafter, the second one of the services 140*b* will retrieve a batch of the first search results from the first queue 134*a* and execute a second sub-query on a second database 108, reducing the number of records searched based on a result of the first sub-query. It is understood that a batch size is selected to find a balance between network latency and time for executing search queries. The parallel execution of the services 140 is described in greater detail with respect to FIG. 7.

In step 624, the computing environment 103 can provide results of the search query to the resulting client device 105. For instance, a first predetermined number of search results can be provided in a first page of a search results display list, although the services 140 are still operating to provide additional search results. It is understood that the computing environment 103 can aggregate search results among the services 140, or identify the search results from a last-executing one of the services 140. The computing environment 103 can send the search results to the client device 105 for display.

In step 627, the computing environment 103 can determine whether the search has been completed. In other words, the computing environment 103 can determine whether all search results have been provided to the client device 105. If the search is not complete, the process reverts to step 621 to continue parallel execution of the services 140 and generate subsequent batches of search results. Alternatively, if the search complete, the process can proceed to completion.

Figure 7:
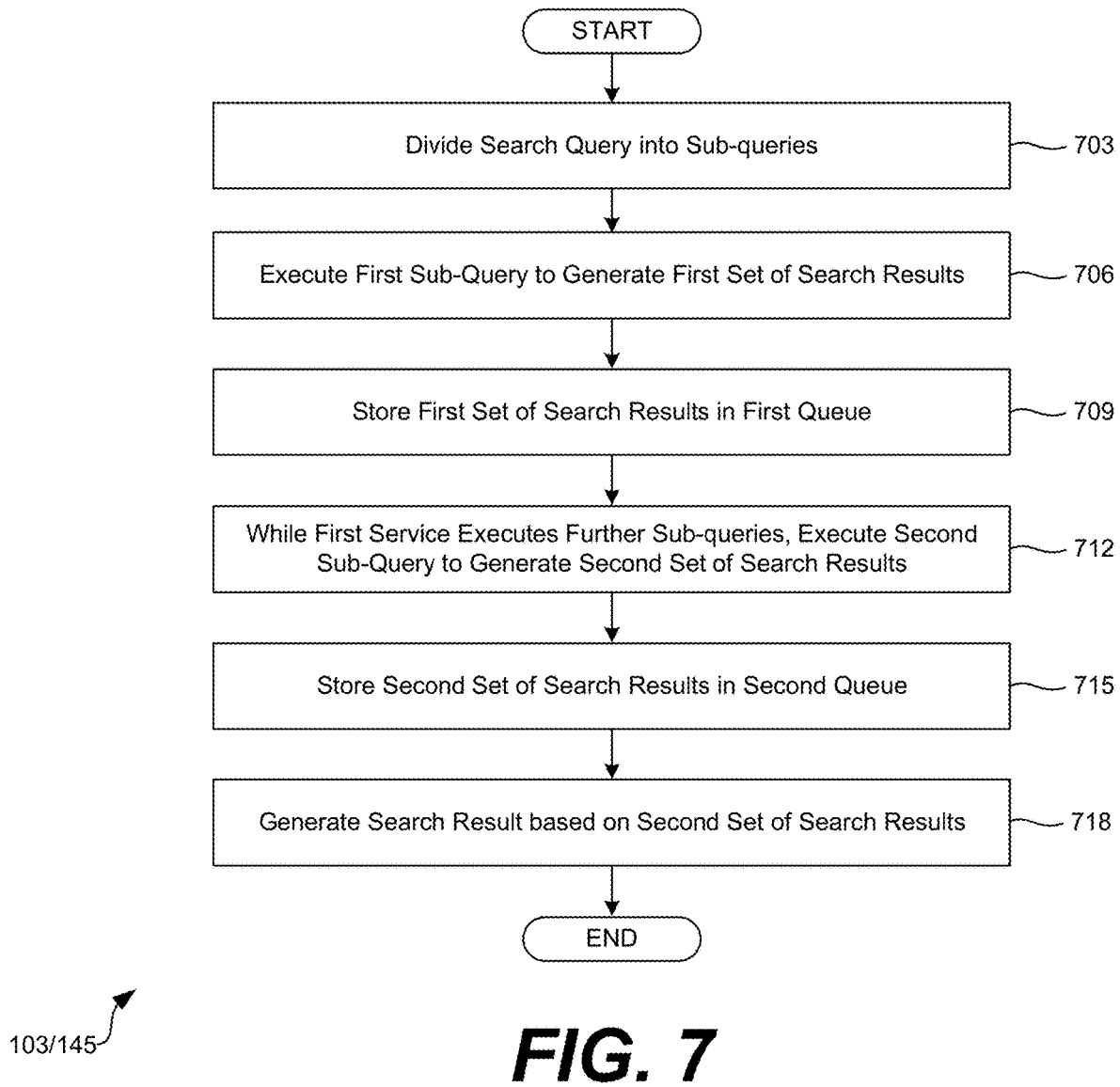

Turning now to FIG. 7, a flowchart is shown that provides one example of the operation of a portion of the networked environment 100. The flowchart of FIG. 7 can be viewed as depicting an example of elements of a method implemented by the successive filtering service 145 executing in the computing environment 103 according to one or more examples. The separation or segmentation of functionality as discussed herein is presented for illustrative purposes only.

In step 703, the computing environment 103 can divide a search query generated from a search from a client device 105 into a plurality of sub-queries. In some examples, the successive filtering service 145 analyzes a search query when received from the client device 105 and divides the search query into various sub-queries. For instance, if a search query requires data from three databases 108, the successive filtering service 145 can create three sub-queries, each sub-query being generated for execution on a respective one of the databases 108. Alternatively, if a search query requires data from four databases 108, the successive filtering service 145 can create four sub-queries, and so forth.

Referring back to FIG. 5, the search query of "FIND ALL devices WHOSE model=AlphaCo AND campaignState=INITIALIZED AND cpu>50" can be divided into a first sub-query of "Find first (or next) three devices whose model is AlphaCo," a second sub-query of "find devices whose campaignState=INITIALIZED and id=(x or y or z)," and a third sub-query of "find devices whose CPU>50 and id=(x or y)." As can be seen from FIG. 5, the number of search results are filtered as the search results progress through each of the services 140.

Referring back to FIG. 7, in step 706, a first service 140a of the computing environment 103 can execute a first sub-query to generate a first set of search results. For instance, the first service 140a can execute the first sub-query to obtain search results from a first database 108a. It is understood that the first service 140a can generate search results in batches. For instance, the first service 140a can use a batch size of thirty to identify thirty search results, and place the thirty search results in the first queue 134a. The first services 140a can continue generating subsequent batches of search results until the first service 140a has identified all search results.

In step 709, the first service 140a can store the first set of search results in a first queue 134a. The first queue 134a can be accessed by the second service 140b or other downstream services 140. For instance, after the first service 140a stores a first batch of search results, the second service 140b can access the first batch to perform its sub-query while the first service 140a continues placing additional batches in the first queue 134a.

In step 712, while the first service 140 continues to execute sub-queries to identify further batches of search results, the computing environment 103 can execute the second sub-query to generate a second set of search results. In step 715, the computing environment 103 can store the second set of search results in a second queue 134b. Like the first queue 134a, the second queue 134b can be accessed by the second service 140b or other downstream services 140.

In step 718, the computing environment 103 can generate search results based at least in part on the second set of search results stored in the second queue 134b. While FIG. 7 illustrates only a first service 140a performing a search query on a first database 108a and a second service 140b performing a search query on a first database 108a, it is understood that three or more services 140, databases 108, queues 134 can be employed depending on a number of databases 108 identified in step 606. It is further understood that the search results can be provided to the client device 105 in batches and the parallel execution of the services 140 can continue until all search results have been provided to the client 105. Thereafter, the process can proceed to completion.

Stored in the memory device are both data and several components that are executable by the processor. Also stored in the memory can be a data store 131 and other data. A number of software components are stored in the memory and executable by a processor. In this respect, the term "executable" means a program file that is in a form that can ultimately be run by the processor. Examples of executable programs can be, for example, a compiled program that can be translated into machine code in a format that can be loaded into a random access portion of one or more of the memory devices and run by the processor, code that can be expressed in a format such as object code that is capable of being loaded into a random access portion of the one or more memory devices and executed by the processor, or code that can be interpreted by another executable program to generate instructions in a random access portion of the memory devices to be executed by the processor. An executable program can be stored in any portion or component of the memory devices including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

Memory can include both volatile and nonvolatile memory and data storage components. In addition, a processor can represent multiple processors and/or multiple processor cores, and the one or more memory devices can represent multiple memories that operate in parallel processing circuits, respectively. Memory devices can also represent a combination of various types of storage devices, such as RAM, mass storage devices, flash memory, or hard disk storage. In such a case, a local interface can be an appropriate network that facilitates communication between any two of the multiple processors or between any processor and any of the memory devices. The local interface can include additional systems designed to coordinate this communication, including, for example, performing load balancing. The processor can be electric or of some other available construction.

Client devices 105 can be used to access user interfaces generated to configure or otherwise interact with the successive filtering service 145 or the computing environment 103. These client devices 105 can include a display upon which a user interface generated by a client application for providing a virtual desktop session (or other session) can be rendered. In some examples, the user interface can be generated using user interface data provided by the computing environment 103. The client device 105 can also include one or more input/output devices that can include, for example, a capacitive touchscreen or other type of touch input device, fingerprint reader, or keyboard.

Although the successive filtering service 145 and other various systems described herein can be embodied in software or code executed by general-purpose hardware as discussed above, as an alternative, the same can also be embodied in dedicated hardware or a combination of software/general purpose hardware and dedicated hardware. If embodied in dedicated hardware, each can be implemented as a circuit or state machine that employs any one of or a combination of a number of technologies. These technologies can include discrete logic circuits having logic gates for implementing various logic functions upon an application of one or more data signals, application specific integrated circuits (ASICs) having appropriate logic gates, field-programmable gate arrays (FPGAs), or other components.

The sequence diagram and flowcharts show an example of the functionality and operation of an implementation of portions of components described herein. If embodied in software, each block can represent a module, segment, or portion of code that can include program instructions to implement the specified logical function(s). The program instructions can be embodied in the form of source code that can include human-readable statements written in a programming language or machine code that can include numerical instructions recognizable by a suitable execution system such as a processor in a computer system or other system. The machine code can be converted from the source code. If embodied in hardware, each block can represent a circuit or a number of interconnected circuits to implement the specified logical function(s).

Although the sequence diagram flowcharts show a specific order of execution, it is understood that the order of execution can differ from that which is depicted. For example, the order of execution of two or more blocks can be scrambled relative to the order shown. In addition, two or more blocks shown in succession can be executed concurrently or with partial concurrence. Further, in some examples, one or more of the blocks shown in the drawings can be skipped or omitted.

Also, any logic or application described herein that includes software or code can be embodied in any non-transitory computer-readable medium for use by or in connection with an instruction execution system such as, for example, a processor in a computer system or other system. In this sense, the logic can include, for example, statements including program code, instructions, and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can include any one of many physical media, such as magnetic, optical, or semiconductor media. More specific examples of a suitable computer-readable medium include solid-state drives or flash memory. Further, any logic or application described herein can be implemented and structured in a variety of ways. For example, one or more applications can be implemented as modules or components of a single application. Further, one or more applications described herein can be executed in shared or separate computing devices or a combination thereof. For example, a plurality of the applications described herein can execute in the same computing device, or in multiple computing devices.

It is emphasized that the above-described examples of the present disclosure are merely possible examples of implementations set forth for a clear understanding of the principles of the disclosure. Many variations and modifications can be made to the above-described embodiments without departing substantially from the spirit and principles of the disclosure. All such modifications and variations are intended to be included herein within the scope of this disclosure.

Therefore, the following is claimed:

1. A system for successive database filtering, comprising:
   at least one computing device;
   program instructions stored in memory and executable in the at least one computing device that, when executed by the at least one computing device, direct the at least one computing device to:
   in response to receipt of a search query that involves multiple ones of a plurality of databases, identify a type of a first database and a type of a second database of the plurality of databases, the type of the second database being different than the type of the first database;
   generate a first sub-query in accordance with the type of the first database such that the first sub-query is compliant;
   generate a second sub-query in accordance with the type of the second database such that the second sub-query is compliant;
   execute, by a first service of a plurality of services, the first sub-query to identify a first set of search results from the first database;
   store, by the first service, the first set of search results in a first queue;
   in response to the first set of search results being placed in the first queue, execute, by a second service of the plurality of services, the second sub-query to identify a second set of search results from the second database using the first set of search results, wherein the first and the second services execute the first and the second sub-queries in parallel;
   the first sub-query is executed by the first service to retrieve a predefined number of search results; and
   while the second service executes the second sub-query, the first sub-query is executed again by the first service, to retrieve another redefined number of search results;
   store, by the second service, the second set of search results in a second queue; and
   generate, by at least one of the first and the second services, a final result of the search query based at least in part on the second set of search results in the second queue and return the final result to a requesting service.

2. The system of claim 1, wherein:
   the search query involves at least a third database of the plurality of databases;
   the search query is divided into at least the first sub-query, the second sub-query, and a third sub-query; and
   the at least one computing device is further directed to:
   in response to the second set of search results being placed in the second queue, execute, by a third service of the plurality of services, the third sub-query to identify a third set of search results from the third database using the second set of search results; and
   store, by the third service, the third set of search results in a third queue, wherein the final result of the search query is further generated based at least in part on the third set of search results in the third queue.

3. The system of claim 1, wherein the first and the second services execute the first and the second sub-queries in parallel by:
   in response to the first set of search results being placed in the first queue, continuing, by the first service, execution of the first sub-query on the first database to continue placing search results in the first queue; and
   while the first one of the services is placing search results in the first queue, execute, by a second one of the services, the second sub-query to identify a second set of search results from a second database using the first set of search results.

4. The system of claim 1, wherein the at least one computing device is further directed to, in response to the receipt of the search query that involves the multiple ones of the plurality of databases:
   identify a number of databases required to be searched from the search query; and
   create at least the first and the second services, wherein a total number of the services created is equal to or greater than the number of databases required to be searched.

5. The system of claim 1, wherein:
   the first database is logically distinct from the second database; and
   the first service or the second service is selected from a group comprising: a virtual machine, a thread, and a process.

6. The system of claim 1, wherein the at least one computing device is further directed to determine an order of execution between at least the first and the second services by:

randomly selecting at least a portion of an identifier uniquely identifying one of the first and the second sets of search results;
performing a count search query using the at least portion of the identifier randomly selected; and
estimating a number of search results to be obtained by the first and the second services based at least in part on a result of the count search query.

7. A method for successive database filtering, comprising:
in response to receipt of a search query that involves multiple ones of a plurality of databases, identifying a type of a first database and a type of a second database of the plurality of databases, the type of the second database being different than the type of the first database;
generating a first sub-query in accordance with the type of the first database such that the first sub-query is compliant;
generating a second sub-query in accordance with the type of the second database such that the second sub-query is compliant;
executing, by a first service of a plurality of services, the first sub-query to identify a first set of search results from the first database;
storing, by the first service, the first set of search results in a first queue;
in response to the first set of search results being placed in the first queue, execute, by a second service of the plurality of services, the second sub-query to identify a second set of search results from the second database using the first set of search results, wherein
the first and the second services execute the first and the second sub-queries in parallel;
the first sub-query is executed by the first service to retrieve a predefined number of search results; and
while the second service executes the second sub-query, the first sub-query is executed again by the first service, to retrieve another predefined number of search results;
storing, by the second service, the second set of search results in a second queue; and
generating, by at least one of the first and the second services, a final result of the search query based at least in part on the second set of search results in the second queue and return the final result to a requesting service.

8. The method of claim 7, wherein:
the search query involves at least a third database of the plurality of databases; and
the method further comprises:
dividing the search query into at least the first sub-query, the second sub-query, and a third sub-query;
in response to the second set of search results being placed in the second queue, executing, by a third service of the plurality of services, the third sub-query to identify a third set of search results from the third database using the second set of search results; and
storing, by the third service, the third set of search results in a third queue, wherein the final result of the search query is further generated based at least in part on the third set of search results in the third queue.

9. The method of claim 7, wherein the first and the second services execute the first and the second sub-queries in parallel by:
in response to the first set of search results being placed in the first queue, continuing, by the first service, execution of the first sub-query on the first database to continue placing search results in the first queue; and
while the first one of the services is placing search results in the first queue, execute, by a second one of the services, the second sub-query to identify a second set of search results from a second database using the first set of search results.

10. The method of claim 7, further comprising:
in response to the receipt of the search query that involves the multiple ones of the plurality of databases:
identifying a number of databases required to be searched from the search query; and
creating at least the first and the second services, wherein a total number of the services created is equal to or greater than the number of databases required to be searched.

11. The method of claim 7, wherein:
the first database is logically distinct from the second database; and
the first service or the second service is selected from a group comprising: a virtual machine, a thread, and a process.

12. The method of claim 7, further comprising determining an order of execution between at least the first and the second services by:
randomly selecting at least a portion of an identifier uniquely identifying one of the first and the second sets of search results;
performing a count search query using the at least portion of the identifier randomly selected; and
estimating a number of search results to be obtained by the first and the second services based at least in part on a result of the count search query.

13. A non-transitory computer-readable medium comprising program instructions for successive database filtering that, when executed by at least one computing device, direct the at least one computing device to:
in response to receipt of a search query that involves multiple ones of a plurality of databases, identify a type of a first database and a type of a second database of the plurality of databases, the type of the second database being different than the type of the first database;
generate a first sub-query in accordance with the type of the first database such that the first sub-query is compliant;
generate a second sub-query in accordance with the type of the second database such that the second sub-query is compliant;
execute, by a first service of a plurality of services, the first sub-query to identify a first set of search results from the first database;
store, by the first service, the first set of search results in a first queue;
in response to the first set of search results being placed in the first queue, execute, by a second service of the plurality of services, the second sub-query to identify a second set of search results from the second database using the first set of search results, wherein
the first and the second services execute the first and the second sub-queries in parallel;
the first sub-query is executed by the first service to retrieve a predefined number of search results; and
while the second service executes the second sub-query, the first sub-query is executed again by the first service, to retrieve another predefined number of search results;

store, by the second service, the second set of search results in a second queue; and generate, by at least one of the first and the second services, a final result of the search query based at least in part on the second set of search results in the second queue and return the final result to a requesting service.

14. The non-transitory computer-readable medium of claim 13, wherein:

the search query involves at least a third database of the plurality of databases;

the search query is divided into at least the first sub-query, the second sub-query, and a third sub-query; and the at least one computing device is further directed to:

in response to the second set of search results being placed in the second queue, execute, by a third service of the plurality of services, the third sub-query to identify a third set of search results from the third database using the second set of search results; and store, by the third service, the third set of search results in a third queue, wherein the final result of the search query is further generated based at least in part on the third set of search results in the third queue.

15. The non-transitory computer-readable medium of claim 13, wherein the first and the second services execute the first and second sub-queries in parallel by:

in response to the first set of search results being placed in the first queue, continuing, by the first service, execution of the first sub-query on the first database to continue placing search results in the first queue; and while the first one of the services is placing search results in the first queue, execute, by a second one of the services, the second sub-query to identify a second set of search results from a second database using the first set of search results.

16. The non-transitory computer-readable medium of claim 13, wherein the at least one computing device is further directed to, in response to the receipt of the search query that involves the multiple ones of the plurality of databases:

identify a number of databases required to be searched from the search query; and create at least the first and the second services, wherein a total number of the services created is equal to or greater than the number of databases required to be searched.

17. The non-transitory computer-readable medium of claim 13, wherein:

the first database is logically distinct from the second database; and the first service or the second service is selected from a group comprising: a virtual machine, a thread, and a process.

18. The non-transitory computer-readable medium of claim 13, wherein the at least one computing device is further directed to determine an order of execution between at least the first and the second services by:

randomly selecting at least a portion of an identifier uniquely identifying one of the first and the second set of search results;

performing a count search query using the portion of the identifier randomly selected; and estimating a number of search results to be obtained by the first and the second services based at least in part on a result of the count search query.

19. The system of claim 1, wherein:

the second service executes the second sub-query to identify the second set of search results by filtering results from the first set of search results in the first queue using data obtained from the second database; and the second set of search results has a lesser amount of search results than the first set of search results.

* * * * *